Figures 1, 2:
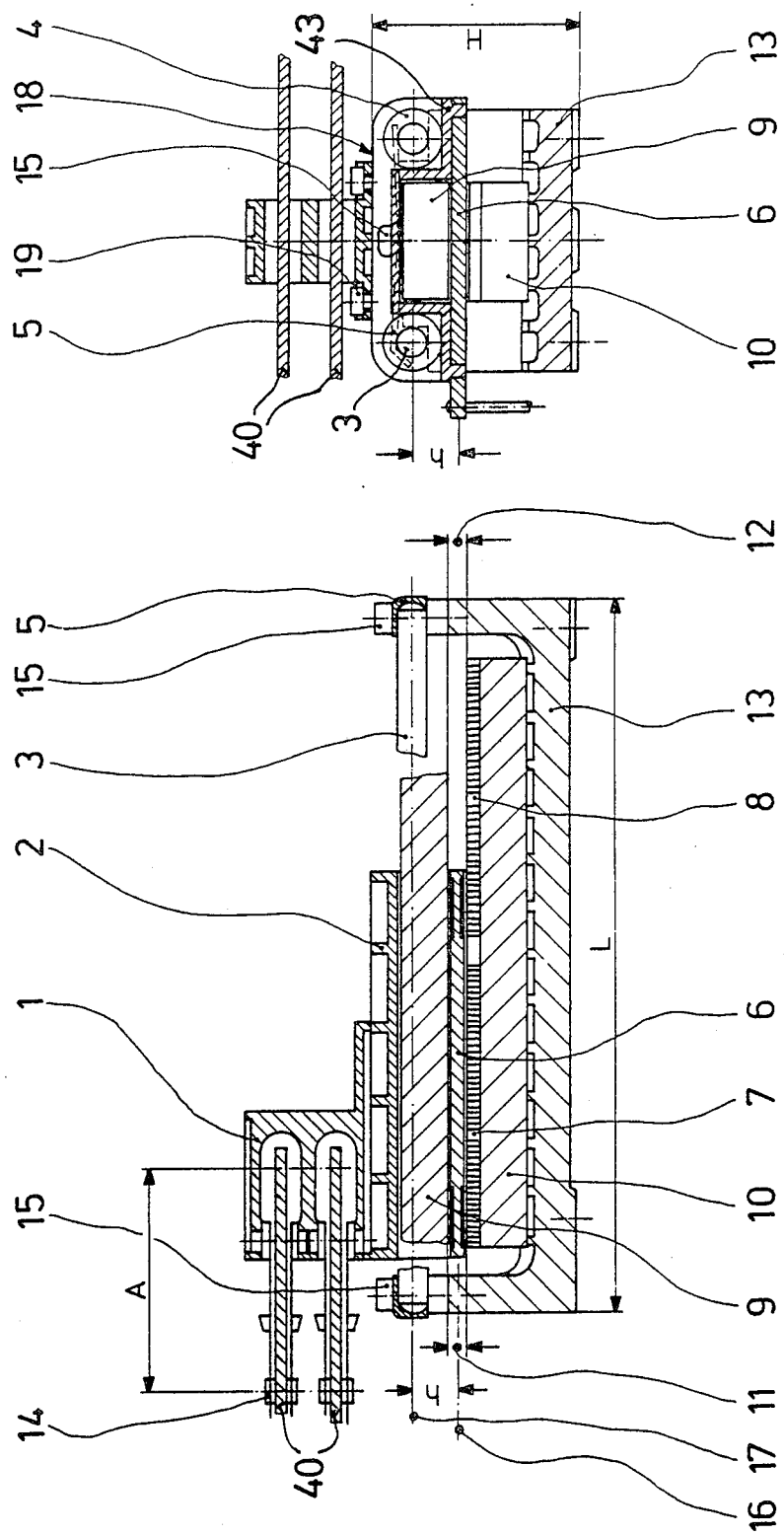

United States Patent [19]

Manzke et al.

[11] 4,322,762
[45] Mar. 30, 1982

[54] DEVICE FOR POSITIONING OBJECTS OF LOW MASS

[75] Inventors: Klaus Manzke, Westheim; Roland Brotzler, Hochdorf-Assenheim, both of Fed. Rep. of Germany

[73] Assignee: BASF Aktiengesellschaft, Ludwigshafen, Fed. Rep. of Germany

[21] Appl. No.: 85,966

[22] Filed: Oct. 18, 1979

[30] Foreign Application Priority Data

Oct. 26, 1978 [DE] Fed. Rep. of Germany ....... 2846599

[51] Int. Cl.³ .............................................. G11B 21/08
[52] U.S. Cl. ...................................... 360/106; 310/13
[58] Field of Search ............ 360/106, 104, 105, 97–99, 360/75, 78; 310/12–14

[56] References Cited

U.S. PATENT DOCUMENTS

| | | | |
|---|---|---|---|
| 3,659,124 | 4/1972 | Lathrop | 310/13 |
| 3,735,163 | 5/1973 | Dijkstra | 310/13 |
| 4,150,407 | 4/1979 | Dijkstra | 360/106 |

FOREIGN PATENT DOCUMENTS 7716251 1/1978 Fed. Rep. of Germany .

OTHER PUBLICATIONS

IBM Tech. Disc. Bull., R. W. Lissner et al., Disk File Actuator, vol. 17, No. 10, Mar. 1975, pp. 3016-3018.
O. E. Olbrich, Positionierer für Plattenspeicher, Feinwerktechnik and Micronic, No. 4, 77, 1973, pp. 151-157.

*Primary Examiner*—Alfred H. Eddleman
*Attorney, Agent, or Firm*—Keil & Witherspoon

[57] ABSTRACT

A device for positioning objects of low mass, particularly magnetic heads over preselected tracks on at least one magnetic disc in a disc file in which there is provided a carriage, displaceable toward and away from the axis of rotation of the magnetic disc, which serves as carrier not only for the magnetic heads but also for the coil of a linear drive means, the said coil being a flat coil which projects into the working air gap of a magnet assembly comprising at least one flat magnet, the flat coil and magnet assembly being arranged in such a way that the force vector lies essentially in the plane in which the carriage is displaceably mounted.

7 Claims, 8 Drawing Figures

DEVICE FOR POSITIONING OBJECTS OF LOW MASS

The present invention relates to a device for positioning objects of low mass, particularly magnetic heads over preselected tracks on at least one magnetic disc which can be coupled to a drive in a memory processing unit in which there is provided a carriage, displaceable toward and away from the axis of rotation of the magnetic disc, which serves as carrier not only for the magnetic heads but also for the coil of a linear drive means, the said drive means comprising at least one flat coil which projects into at least one working air gap of a magnet assembly comprising at least one flat magnet.

German Utility Model No. 7,716,251 discloses a swinging arm actuator. However, swinging arm actuators cannot be used for all positioning applications, particular reasons being that they are more voluminous and lack the desired head positioning accuracy because yaw is unavoidable, as a result of which the flying behavior of the head in the disc file is impaired. The use of flat coils for linear-motor head positioners is known in principle from the article entitled "Positionierer für Plattenspeicher" by O. E. Olbrich in Feinwerktechnik+Micronic, No. 4, 77, 1973. It is known for example that such a flat coil is fastened in a frame-shaped carriage which is guided without play and carries the magnetic heads. Current is advantageously supplied via flexible leads. This basic data is however not sufficient to realize an improved positioning system without further research and development.

It is an object of the present invention to provide a positioner which is compact and has low power requirements and can also be manufactured economically.

We have found that this object is achieved with a device for positioning objects of low mass, particularly magnetic heads over preselected tracks on at least one magnetic disc which can be coupled to a drive in a memory processing unit in which at least one head support, displaceable toward and away from the axis of rotation of the magnetic disc, for at least one magnetic head, and at least one coil support for a linear drive means are provided, the said drive means comprising at least one flat coil which projects into at least one working air gap of a magnet assembly comprising at least one flat magnet, wherein the head support and the support for the flat coil are both mounted on a displaceable carriage in the form of a hollow member, the flat coil and the magnet assembly being arranged relative to one another in such a way that the force vector acting on the carriage is essentially in the plane in which it is displaceably mounted.

In a further embodiment of the device of the invention, the magnet assembly has two working air gaps which are arranged next to each other in the same plane, the poles of the magnets being so arranged that poles of opposite polarity are adjacent to each other, each pair of coplanar adjacent poles of opposite polarity being magnetically connected together via a common flux-conducting member, and the flat coil is of elongate shape, the transverse conductors of said coil being always located inside the working air gaps of the magnet assembly, and the longitudinal conductors being always located outside said air gaps.

As a result of the flat shape of the coil and due to the fact that the coil is integrated with the carriage, it is possible to reduce the overall length and height of the positioning device, while at least retaining the usual driving moment and hence reducing the access times. In addition, such a positioning device is suitable for positioning any kind of object of low mass, e.g. optical devices such as lenses and optical scanners.

The term "positioning", as used herein, means not only the moving and aligning of a first member relative to a second member, but also the controlled movement of the two members relative to one another, e.g. the oscillation thereof at any desired frequency.

In an advantageous embodiment of the device of the invention, at least one of the flux-conducting members (preferably both of them) extends (extend) through the carriage. As a result, surprisingly good space utilization and almost ideal conditions with respect to the force vector applied are achieved.

In a further advantageous embodiment of the device according to the invention, the carriage is provided with flange-like members which serve as mounts for the coil with its support, or as the coil support itself.

In a practical embodiment, the carriage has two spaces of substantially the same size and shape which are of rectangular cross section.

Advantageously, the carriage is displaceably mounted on two guide rods.

In an embodiment which is economical to manufacture, the device comprises three units assembled from the following interconnectable individual parts:

(a) Frame, flux-conducting member(s), magnet(s);

(b) Carriage, flat coil, guide bearings, and guide rods; and (c) Head mount and magnetic heads carried on support arms.

To sum up, the invention provides a positioning device which moves the objects, particularly the write-/read heads in data storage systems, rectilinearly and hence enables them to be reliably positioned over the entire positioning range along the ideal path. In addition, power requirements are extremely low and dissipation is slight. The positioner of the invention can therefore be used in a compact, low-cost disc file system.

Figure 3:
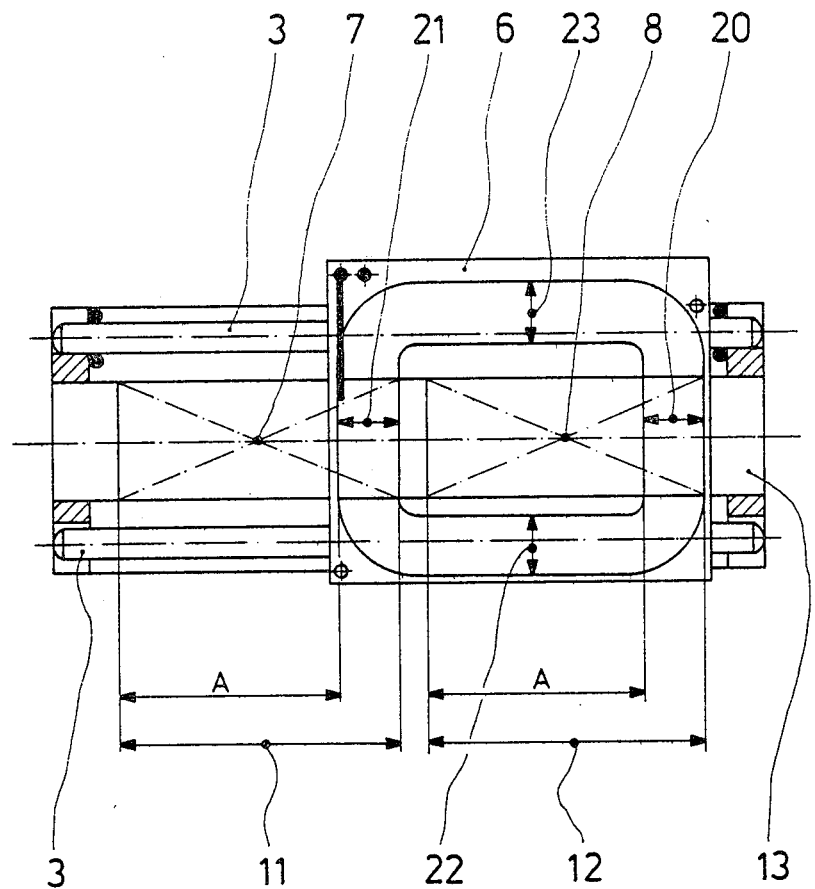
Figure 7:
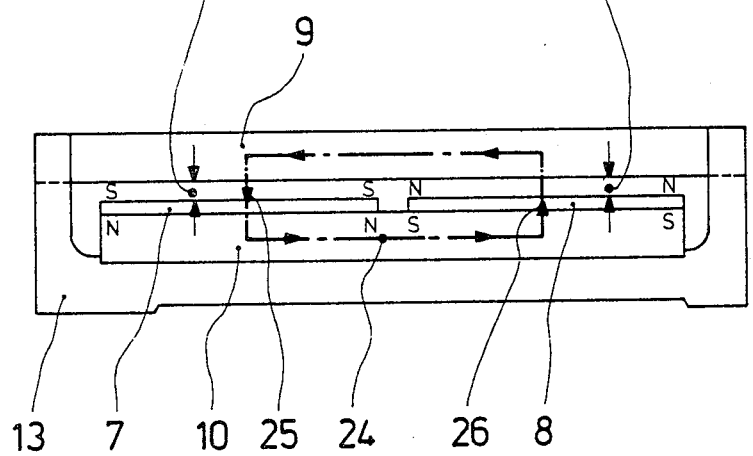
Figure 4:
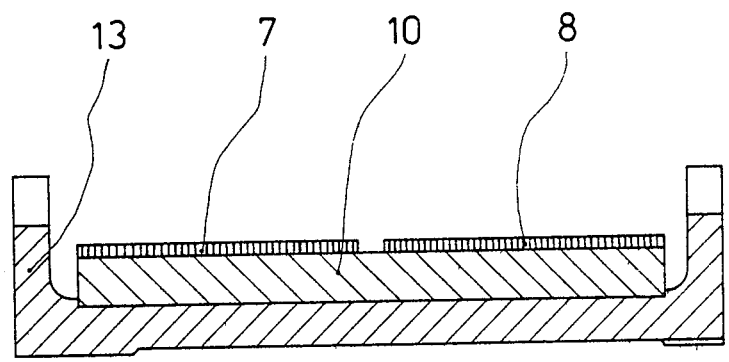
Figure 6:
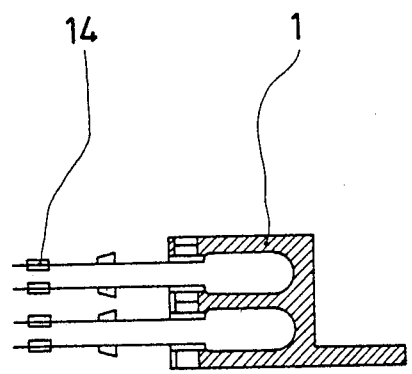
Figure 5:
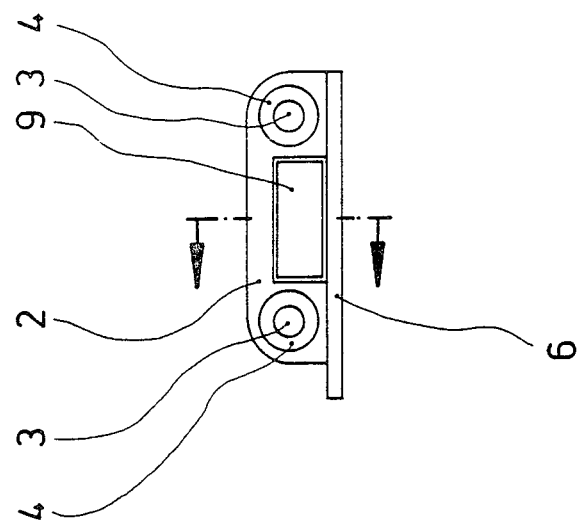
Figure 5:
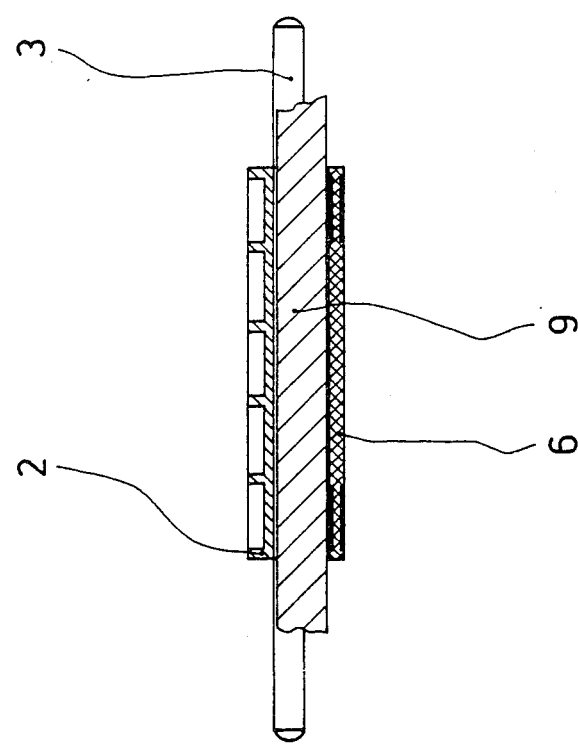
Figure 8:
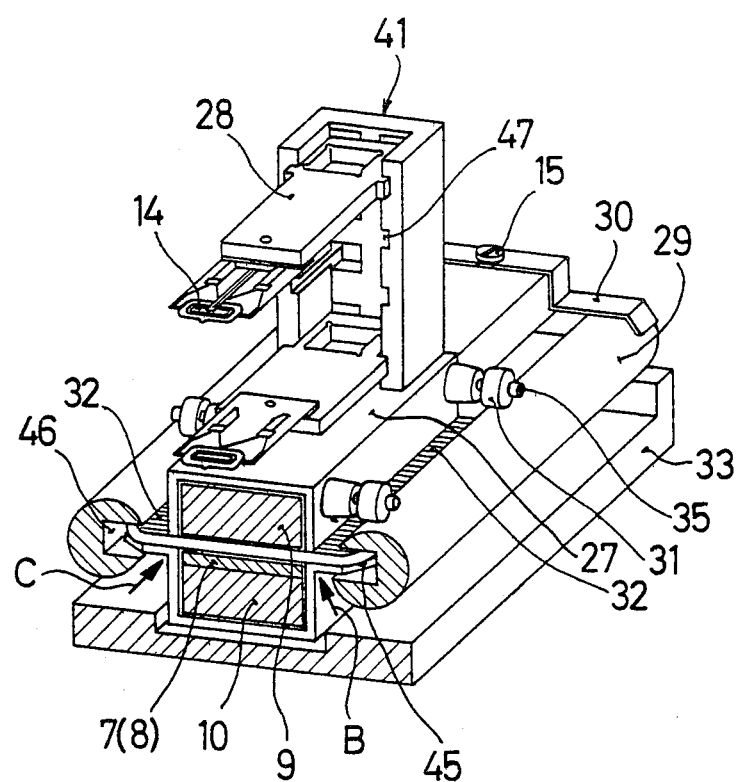

Further details of the invention are disclosed in the following description of the embodiments illustrated in the accompanying drawings, in which FIG. 1 is a schematic longitudinal section through a positioning device of the invention for a disc file, also showing the magnetic heads and portions of magnetic discs, FIG. 2 is a schematic cross-sectional, front elevational view of the positioning device of FIG. 1, showing portions of magnetic discs as shown in FIG. 1, but not the magnetic heads, FIG. 3 is a schematic plan view of the magnetic assembly, the flat coil, the guide rods and the frame, FIG. 4 is a schematic cross-sectional side view of one of the units employed in the positioning device of the invention, consisting of the frame, the lower flux-conducting member and two permanent magnets, FIG. 5 shows a schematic side view, partly in section, and a schematic end view of a further unit consisting of a carriage, a flat coil, the guide bearings, the guide rods and the upper flux-conducting member, FIG. 6 is a schematic side view, partly in section, of a head support unit, consisting of a head mount, head support arms and magnetic heads, for two magnetic discs, FIG. 7 is a schematic side view of the frame and the entire magnet assembly, showing the polarity and the magnetic flux paths, and FIG. 8 is a perspective view, partly in section, of a further positioner design.

The positioning device for a magnetic disc recording unit, shown in FIG. 1, consists essentially of head mount 1; carriage 2; guide rods 3; guide bearings 4; fastening means 5 for the guide rods 3; flat coil 6; magnetic devices 7 and 8; flux-conducting members 9 and 10, the latter together with the magnetic devices forming coplanar adjacent working air gaps 11 and 12; and frame 13.

The magnetic heads 14 are carried by head mount 1, a magnetic head being allocated to each side of the magnetic discs 40. FIGS. 1, 2 and 6 show a head support unit for two magnetic discs 40. It is of course also possible, as shown in FIG. 8, to use a head mount 41 with exchangeable head support arms 28, it thus being possible to match the number of head support arms to the number of magnetic discs.

Heads mounts 1 and 41 are displaceable within the range A, and are fastened to carriages 2 (FIG. 1) and 27 (FIG. 8) respectively. Carriage 2 is in the form of a single, substantially U-shaped member with flange-like members 43, the open side of said member being closed by flat coil 6 with its support, so that a space of rectangular cross section is formed. The flat coil 6 is mounted on the flange-like members (in FIG. 2 on the lower side thereof). In the design shown in FIG. 2 guide bearings 4 in the form of ball bearings, through which guide rods 3 pass, are fastened to the upper side of the flange-like members, so that carriage 2 including head mount 1 with magnetic heads 13 and coil 6 can be moved relative to guide rods 3, i.e. can be displaced longitudinally. Plain bearings may also be used as guide bearings. Magnetic devices 7 and 8 may be permanent magnets or electromagnets which are arranged below coil 6 to save space. This has the further advantage that the force vectors acting on the carriage during positioning are only slightly below the plane in which the carriage is mounted, the difference in height being height h shown in FIGS. 1 and 2. The smaller h is, the better guidance is because large tilting moments do not occur.

A further positioner design is described below with reference to FIG. 8. The same parts bear the same reference numerals.

In contrast to the design shown in FIGS. 1–7, carriage 27 comprises a rectangular tube having a central horizontal web. Here again, flange-like members 45 are provided, in this case approximately on a level with the central horizontal plane of the carriage. As can be seen in the drawing, flat coil 32, represented by transverse lines, is carried on the upper surfaces of the flange-like members 45; the transverse winding sections are not visible, but pass through slits, not shown, in carriage 27.

Flat coils 6 and 32 can be prepared in any suitable manner, for example in the form of one or more superposed conductor loops produced by printed circuit techniques. It is also advantageous to produce the conductors from aluminum or copper foil suitably attached to a non-conducting and non-magnetic support.

In the design shown in FIG. 8 the flange-like members 45 are frictionlessly displaceable in longitudinal grooves 46 in guide rods 29. For example, guide rolls 31 on fixed axles 35 are provided on the upper half of carriage 27, which rolls run on guide rods 29 with only slight friction. It is advantageous to employ three such rolls which are arranged at three points on either side of the carriage. Further guide rolls for carriage 27 are provided at the points indicated by arrows B and C, the axles of the rolls being inclined at an angle of 45°, e.g. fixedly mounted rolls on one side and pivotally mounted rolls, urged into their normal position by a spring, on the other side; at least three such inclined rolls should be provided on the lower half of the carriage. Such a bearing arrangement which is free of play and almost frictionless is easy to adjust and economical to manufacture. Flux-conducting members 9, 10 extend through carriage 27 above and below the central horizontal web. In FIG. 8 all moving parts are shown in elevation and all stationary parts in section.

Guide rods 29 and flux-conducting members 9 and 10 are fastened to frame 33 by means of screws 15 and sheet-metal clamping strips 30.

In FIG. 8, head mount 41 is integral with carriage 27 and has, in addition to two head support arms 28 with heads 14, retaining grooves for two further head supports, so that a maximum of four head supports with a total of 7 magnetic heads can be provided for 4 magnetic discs.

The components of the above-described embodiments are advantageously preassembled in three units, as described below, which units are then assembled to form the complete positioner. These units are described with reference to FIGS. 1 to 7.

Unit 1 (FIG. 4) consists of frame 13, flux-conducting member 10 and permanent magnets 7 and 8, said magnets being adhered to the flux-conducting member 10 which in turn is fastened to the frame 13.

Unit 2 (FIG. 5) consists of carriage 2, flat coil 6 and guide bearing 4. These three components are firmly connected together. Flux-conducting member 9 is then inserted in this assembly by passing it through the hollow carriage 2 which is open at both ends, and then guide rods 3 are passed through bearings 4.

Unit 3 (FIG. 6) consists of head mount 1 and heads 14 carried on support arms.

As next step, the complete unit 2 is inserted in unit 1 from above and fastened thereto by means of two screws 15 and two sheet-metal clamping strips 5, as shown in FIGS. 1 and 2, so that the upper flux-conducting member 9 and guide rods 3 are firmly attached to unit 1.

At this stage, the assembly has a length L and a height H and can be moved over a range A, h being the distance between the plane in which the positioning forces act on the carriage and the plane in which the carriage is guided (which latter plane roughly corresponds to the plane in which the center of gravity of the moving parts lies); such a construction permits at most only a slight tilting moment during positioning.

The assembly just described constitutes a functioning unit and is finally firmly attached to unit 3 (cf FIG. 6), the latter being placed on the top of carriage 2 and fastened thereto by means of three screws (cf. FIGS. 1 and 2). The overall height of unit 3 and the number of heads supported thereon can be adapted to suit the number of discs in the disc file.

The drive system for both types of positioner is shown in principle in FIGS. 3 and 7. FIG. 7 shows frame 13, 33 with the attached magnet assembly consisting of, for example, flat permanent magnets which are arranged behind one another in the same plane, and flux-conducting members 9 and 10. By virtue of the polarity of permanent magnets 7 and 8, the magnetic flux indicated by line 24 passes through working air gaps 11 and 12. Arrows 25 and 26 indicate the directions of flux in air gaps 11 and 12 respectively. Frame 13, 33 must however be made of magnetically non-conducting material, e.g. an aluminum alloy, to prevent a magnetic short circuit.

Since, when coil 6 is energized, current flows in opposite directions in the transverse conductor sections 21 and 20 and these conductor sections do not leave their respective air gaps, i.e. transverse conductor section 20 remains in working air gap 12, and transverse conductor section 21 in working air gap 11, and the directions of magnetic flux in the working air gaps are opposite one another, a linear force of the same magnitude and acting in the same direction is exerted on each transverse conductor section 20, 21 over the entire positioning range A, the force vectors lying essentially in the plane in which the carriage is guided, a fact which is realized in the design of FIG. 8. The longitudinal conductor sections 22 and 23 are always located outside working air gaps 11 and 12.

It should be emphasized that the force vector exerted by the drive system, which vector lies in the plane of the coil, and the plane in which the carriage is guided are at most only a slight distance above one another. Ideally, the plane in which the carriage is guided, the plane in which the center of gravity of the carriage lies, and the plane in which the force vector lies coincide, so that no tilting moments at all can act on the carriage and on the magnetic heads in particular. These ideal conditions, except with respect to the plane in which the carriage is guided, are realized in the design of FIG. 8.

Owing to the fact that the dimensions of the moving parts (chiefly those of the carriage) are small in relation to the requisite positioning range A, the mass of these parts can also be kept small, as a result of which low power consumption can be achieved together with acceptable access times, this low power consumption being made possible by, inter alia, the fact that the coil of the above-described design with its support is integrated in the carriage and consequently does not have to be moved as an additional mass.

Economical quantity production of the positioner of the invention is made possible by the fact that, for example, the flux-conducting members can be made from flat steel bars which only have to be cut up into pieces of the desired length, and the permenant magnets are of a simple bar shape. As a result, tooling costs are kept down and assembly of the parts does not present any problems. Coils 6 and 32 are advantageously in the form of a plurality of superposed conductor loops produced by printed circuit techniques, or produced from aluminum foil for example, as mentioned above. The other parts may be without exception plastics moldings or metal pressings or castings.

In the above-described embodiments, the flat coil 6, 32 is advantageously wound from anodized aluminum foil measuring 2.5×0.05 mm, an optimum space factor being achieved because the anodized layer of only about 3 μm in thickness acts as insulation. Moreover, the use of anodized aluminum foil enables the maximum possible number of turns to be accommodated in a given winding space, while keeping the mass very low due to the fact that the specific weight of aluminum is lower than that of copper; very low mass is of great importance because the coil is a positioner part which has to be moved and accelerated. The number of turns that can be accommodated in the case of a winding depth of 10 mm is 180, the conductor cross section permitting a current density of 2 amperes.

At a mean magnetic induction in the air gaps of about 3000 gauss the track-to-track access time is of the order of 3 milliseconds in the case of the above-described coil made of aluminum foil, the average access time being about 35 to 40 milliseconds and the access time from the outer track to the inner track and vice versa being 70 milliseconds. Whereas head acceleration of almost 4 g is possible with the version according to FIG. 1, more than 4 g can be readily achieved with the version shown in FIG. 8. As a result of the compact design of the invention, the overall length of the positioner can be reduced by about 50%, as compared with conventional positioning devices.

A sufficiently high magnetic flux density is achieved if magnetic material is employed which has a high energy product and a low demagnetization factor. Small flat pieces of permanent magnet material which have a high energy product $(BH)_{max}$ and are highly insensitive to demagnetizing magnetic fields and are based on cobalt and rare earths are very suitable. However, other suitable magnetic materials may also be used. The small flat pieces of permanent magnet material are thin compared with the flux-conducting member(s), the thickness ratio being for example 1:8.

The carriage shown in FIG. 8 is advantageously made of a magnesium alloy which imparts extremely high rigidity thereto, while keeping its mass down. However, any other material/design combination which is suitable from the strength point of view may be used, e.g. high-strength thermosetting resins optionally reinforced with glass or plastics fibers.

We claim:

1. A device for positioning objects of low mass, particularly magnetic heads over preselected tracks on at least one magnetic disc which can be coupled to a drive in a memory processing unit in which at least one head support, displaceable toward and away from the axis of rotation of the magnetic disc, for at least one magnetic head, and at least one coil support for a linear drive means are provided, the said drive means comprising at least one flat coil which projects into at least one working air gap of a magnet assembly comprising at least one flat magnet, wherein the head support and the support for the flat coil are both mounted on a displaceable carriage in the form of a hollow member, wherein there are provided two flux conducting members which extend in spaced parallel relation to each other in the direction of the carriage movement, with said carriage enclosing at least one of said flux conducting members on at least three sides thereof, wherein said support for the flat coil extends in a plane parallel to and between said flux conducting members and wherein there are provided means for displaceably mounting the carriage essentially in the plane of the flat coil in which last-mentioned plane the force vector acts on the carriage.

2. A positioning device as claimed in claim 1, wherein the magnet assembly has two working air gaps which are arranged next to each other in the same plane, the poles of the magnets being so arranged that poles of opposite polarity are adjacent to each other, each pair of coplanar adjacent poles of opposite polarity being magnetically connected together via a corresponding one of said flux-conducting members, and the flat coil is of elongate shape, the transverse conductors of said coil being always located inside the working air gaps of the magnet assembly, and the longitudinal conductors being always located outside said air gaps.

3. A positioning device as claimed in claim 1, wherein the carriage is provided with flange-like members which serve as mounts for the coil with its support, or as the coil support itself.

4. A positioning device as claimed in claim 3, wherein the carriage has two spaces of substantially the same size and shape which are of rectangular cross section.

5. A positioning device as claimed in claim 3, wherein the carriage displaceably mounted on two guide rods.

6. A positioning device as claimed in claim 1, 2, 3, 4 or 5, wherein the carriage is integral with the head support.

7. A positioning device as claimed in claim 1, 2, 3, 4 or 5, wherein three units are provided which are assembled from the following interconnectable individual parts:
 (a) Frame, flux-conducting member(s), magnet(s);
 (b) Carriage, flat coil, guide bearings, and guide rods; and
 (c) Head support and magnetic heads carried on support arms.

* * * * *